July 11, 1939. D. J. AJOUELO ET AL Re. 21,141
MACHINE FOR MAKING AND INSERTING METALLIC FASTENERS
Original Filed Nov. 2, 1933 3 Sheets-Sheet 1
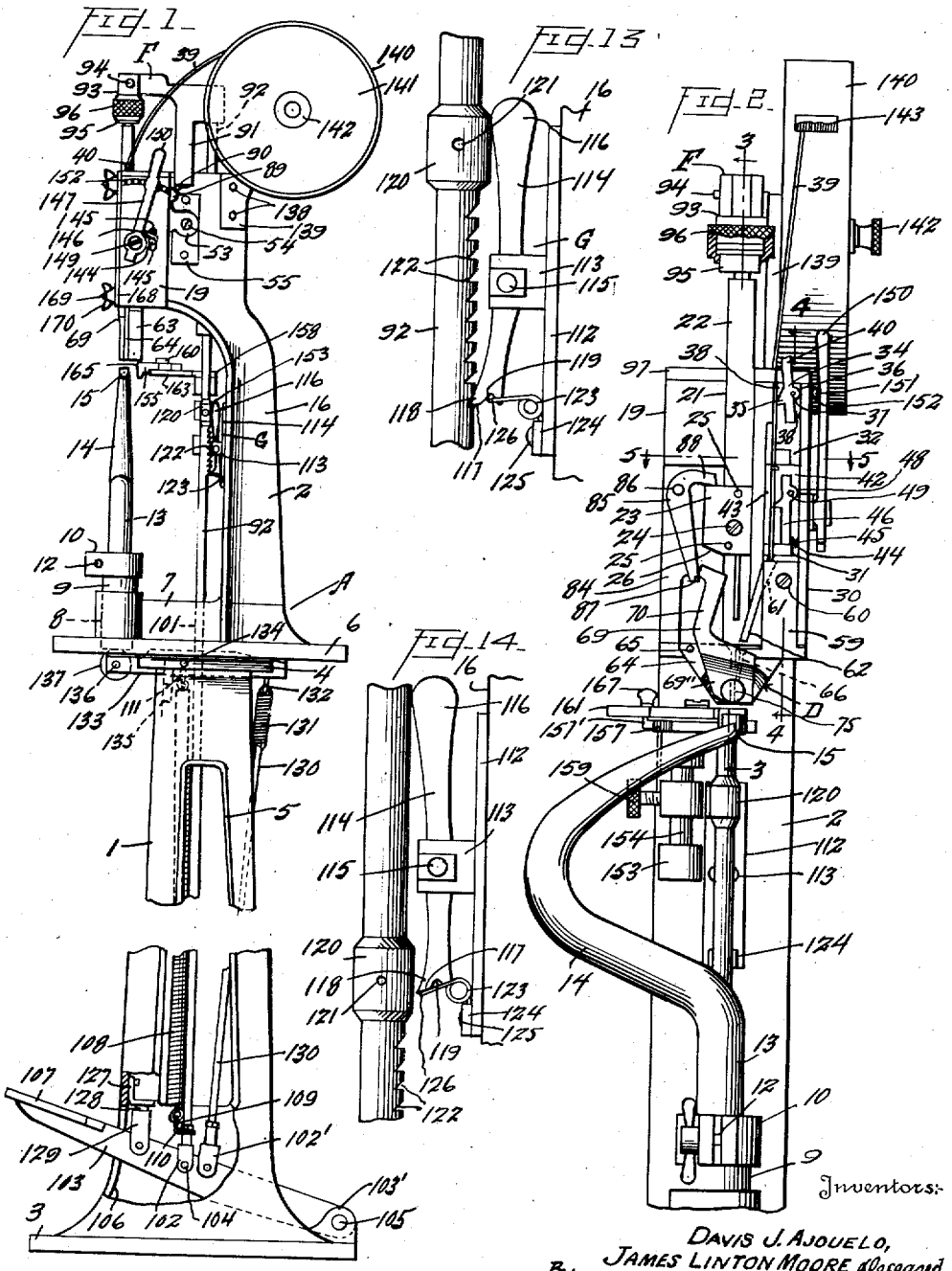
Inventors:
DAVIS J. AJOUELO,
JAMES LINTON MOORE, deceased.
By SUSAN ANSLEY MOORE, Executrix.
By
Semmes Kerr & Semmes Attorneys July 11, 1939. D. J. AJOUELO ET AL Re. 21,141
MACHINE FOR MAKING AND INSERTING METALLIC FASTENERS
Original Filed Nov. 2, 1933 3 Sheets-Sheet 2
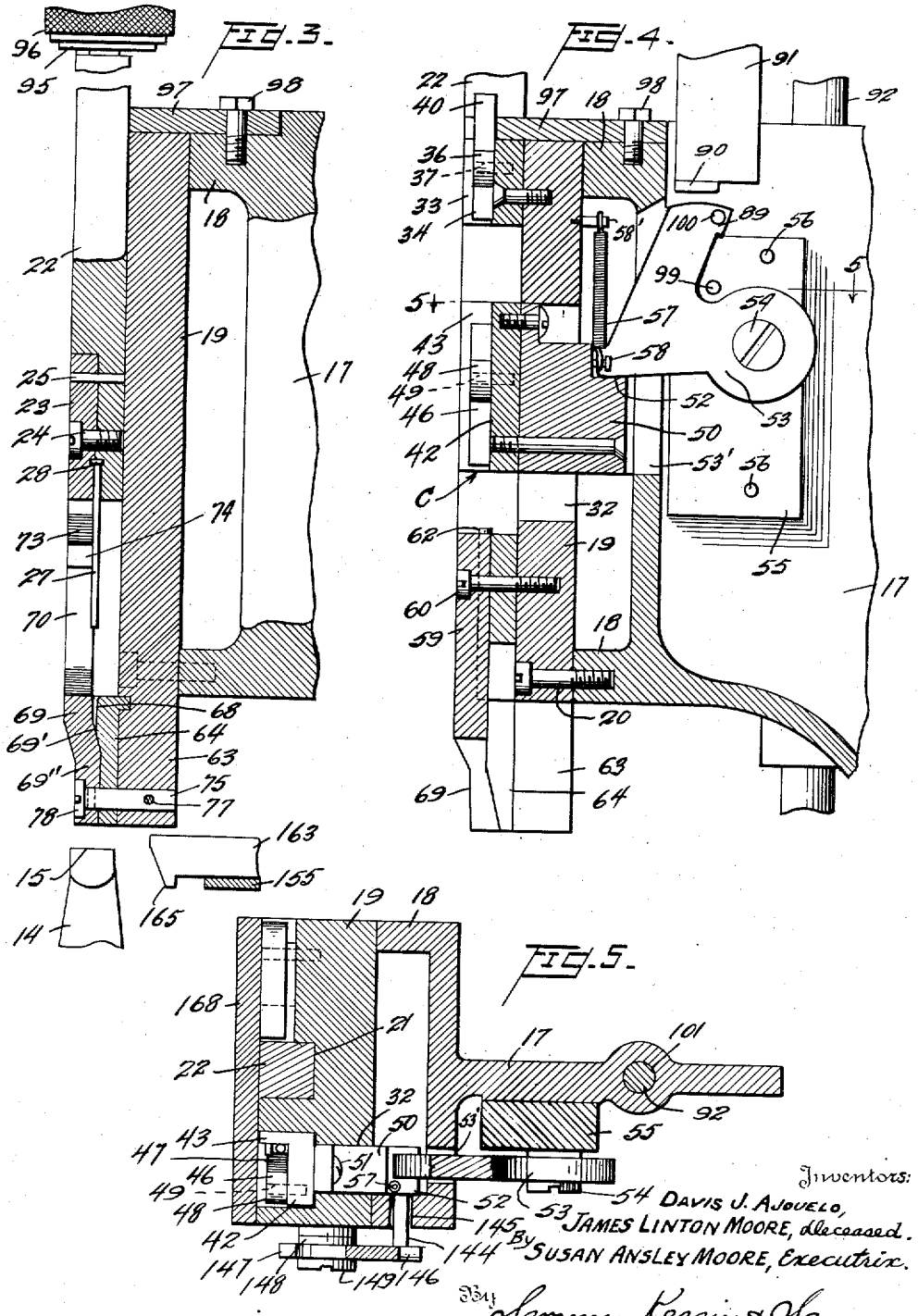
Inventors:
DAVIS J. AJOUELO,
JAMES LINTON MOORE, deceased.
By SUSAN ANSLEY MOORE, Executrix.
By Semmes, Keegin & Semmes
Attorneys

MACHINE FOR MAKING AND INSERTING METALLIC FASTENERS

Original Filed Nov. 2, 1933 3 Sheets-Sheet 3

Inventors:
DAVIS J. AJOUELO,
JAMES LINTON MOORE, deceased.
By SUSAN ANSLEY MOORE, Executrix.
By Semmes, Keeling & Semmes
Attorneys Reissued July 11, 1939

Re. 21,141

UNITED STATES PATENT OFFICE 21,141

MACHINE FOR MAKING AND INSERTING METALLIC FASTENERS

Davis J. Ajouelo, Atlanta, and James Linton Moore, deceased, late of Decatur, Ga., by Susan Ansley Moore, executrix, Decatur, Ga., assignors to The Auto-Soler Company, Atlanta, Ga., a corporation of Georgia Original No. 2,049,240, dated July 28, 1936, Serial No. 696,427, November 2, 1933. Application for reissue July 18, 1938, Serial No. 220,014

19 Claims. (Cl. 1—29)

Generically this invention relates to machines for uniting layers of material, but it more especially is directed to the type of machine designed for making and inserting metallic fasteners, and the like, and embodying novel devices and combinations of mechanism for expeditiously effecting the uniting of layers of material such as the soles of shoes, boots and the like.

One of the principal objects of this invention is the provision for a device of this character for making and inserting fastening elements formed from a continuous wire comprising a novel fastener inserting mechanism and unique knife assembly for forming and predeterminedly positioning the respective fastening elements with respect to the inserting mechanism.

An important object of this invention is the provision of a device for making and inserting fastening elements formed from a continuous wire embodying novel means for feeding the wire to the cutting or shearing mechanism, maintaining the wire against retraction, and controlling the feeding mechanism to determine and vary the lengths of the respective fastening elements, as desired.

Another important object of this invention is the provision of a device of this character embodying a fastener inserting plunger mechanism and wire feeding mechanism synchronously associated, operating means for actuating said plunger in fastener inserting direction, and means for preventing said plunger moving in the opposite direction until it has entirely completed its limit of movement in inserting direction.

A further important object of this invention is the provision of a device of this character embodying a fastener inserting plunger mechanism, a wire feeding mechanism, a shearing or cutting mechanism, and operating means for effecting simultaneous operation of said mechanisms during the downward or inserting movement of the plunger mechanism, and means associated with said operating means for preventing return of the plunger mechanism to its initial position until it has completed its downward stroke, thereby insuring expulsion of each fastening element from the device, its insertion in the material to be united, and likewise insuring formation of the respective fasteners into uniform and predetermined lengths.

A still further object of this invention is the provision of a device of this character for making fastening elements from a continuous piece of wire and inserting the respective elements in layers of material to be united such as soles of shoes, means for regulating the position of the soles or material with respect to the inserting mechanism, and additional means for moving and maintaining the anvil mechanism in engagement with said soles or material during the uniting operation.

With these and other objects in view, which will become apparent as the description proceeds, the invention resides in the construction, combination and arrangement of parts, hereinafter more fully described and claimed, and illustrated in accompanying drawings, in which like characters of reference indicate like parts throughout the several figures, of which:

Fig. 1 is side view of our improved machine for making and inserting metallic fastening elements.

Fig. 2 is a front view of upper part of the machine with front plate removed.

Fig. 3 is a section on line 3—3 of Fig. 2.

Fig. 4 is a section on line 4—4 of Fig. 2.

Fig. 5 is a section on line 5—5 of Figs. 2 and 4.

Fig. 13 is an enlarged detail view of the mechanism for controlling the release of the plunger; and Fig. 14 is a similar view showing the rod in lowered position.

Figure 6:
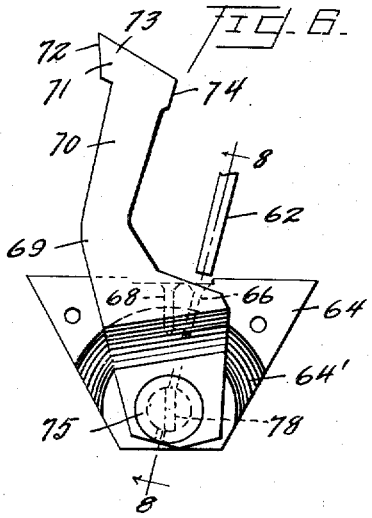
Fig. 6 is a front elevation of the wire shearing or cutting elements.
Figure 7:
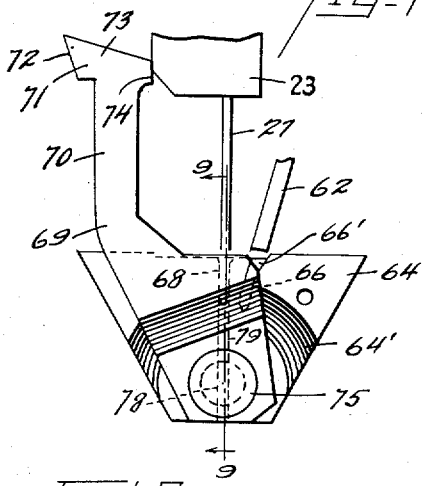
Fig. 7 is a similar view after wire has been cut.
Figure 8:
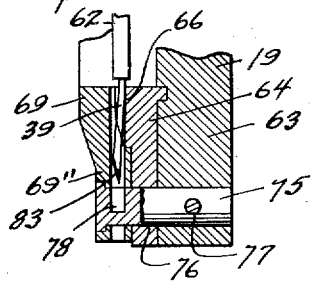
Fig. 8 is a sectional view on line 8—8 of Fig. 6, showing the wire in position to be cut.
Figure 9:
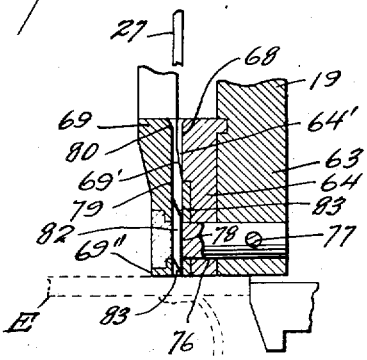
Fig. 9 is a sectional view on line 9—9 of Fig. 7.
Figure 10:
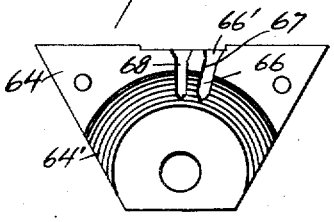
Fig. 10 is a front view of the stationary blade.
Figure 11:
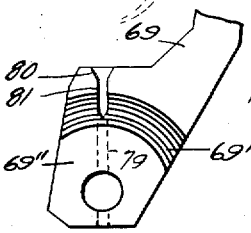
Fig. 11 is a rear view of the movable or shearing blade.
Figure 12:
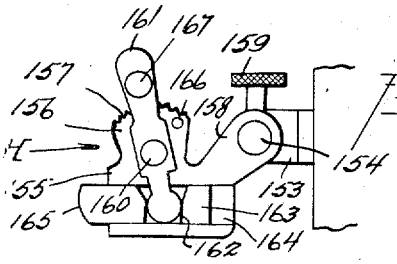
Fig. 12 is a plan view of the slide mechanism regulating the position of the shoe with respect to the fastener or nail feeding opening.

Briefly, it was to provide a machine embodying novel features for making and inserting metallic fasteners in the soles of shoes and the like, comprising a wire feeding mechanism, a plunger fastener inserting mechanism, and a knife or wire shearing mechanism, the latter adapted to form the respective fasteners and successively position each fastener as formed in the path of the plunger mechanism for inserting said fastener in the material to be united, said mechanisms being synchronously associated, a control rod mechanism for moving said plunger in inserting direction, and means associated with said control rod for preventing its upward movement until the plunger has completed its downward stroke, so that a respective fastener is formed, positioned with respect to said plunger, and inserted in the materials to be united during each downward stroke of said plunger mechanism, that we designed the device forming the subject matter of this invention.

In the illustrated embodiment characterizing this invention there is shown a frame, A, comprising a pedestal section 1, and a top section 2. The pedestal section is formed with an integral base portion 3, and in the present instance tapers towards its upper end terminating in a lateral flange 4. Said frame section is of hollow construction and is formed in its respective sides with elongated openings 5, and formed integral with or suitably connected to flange 4, is a table or shelf section 6, on which is mounted frame section 2 bolted or otherwise suitably secured thereto. Section 2 is formed with a substantially rectangular base 7, which at its free end is formed with a vertical bearing opening 8, in which is mounted movable bushing element 9, terminating at its upper end in split ring 10, and through the meeting ends of which is mounted adjusting screw 12, adapted to adjustably clamp the lower end 13, of the substantially horn-shaped anvil member 14, formed on its upper end with anvil or material contacting face 15, which is in vertical alignment with lower end 13. Anvil member 14 is adjustable in accordance with the different shapes and types of shoes or material being operated upon, as will be apparent.

Section 2 at one end of base 7, is formed with vertical standard 16, terminating at its upper end in head 17, extending in vertical alignment with base 7. The face of head 17 is formed at opposite edges with flange projections 18, on which is mounted face plate 19, secured to said head by set screws 20, or other suitable fastening means. The plate 19, is suitably recessed as at 21, to provide a seat for plunger 22, slidably mounted therein. The extremity of plunger 22, is countersunk to receive a cam block 23, secured by set screw 24 and dowel pins 25, said block extends beyond one edge of the plunger, and is formed at its lower edge with cam face 26. The plunger point 27, is formed with head 28, adapted to seat in the complemental countersunk openings formed in said plunger and cam plate as will be clear without further discussion.

Plate 19 is countersunk intermediate plunger 22 and edge 30, as at 31 and formed with an opening 32. The upper end of said plate 19 is recessed as at 33 in which is mounted hold-back ratchetlike finger 34, formed on one side with wire engaging tooth 35 and on the opposite side with apertured extension 36, adapted to receive dowel pin 37 carried by said plate 19. Mounted intermediate the lower end of element 34 and the wall of said recess is spring 38 for holding tooth 35 in engagement with wire 39 to prevent slippage or withdrawal of the wire, unless moved out of engagement therewith, by the manual movement of end 40, as will be clear without further explanation.

The wire feeding mechanism C, is adapted to be mounted in the recess or countersunk portion 31, and comprises block 42, formed with flange 43, extending the length of the block at one edge, and flange portion 44 at the lower opposite corner adapted to form a seat for spring 45 engaging the lower end of ratchet finger 46 formed, similar to the finger 34, on one side with wire engaging tooth 47 and on the opposite side with extension 48 rotatably mounted on the suitably secured pin 49. Mounted on the rear surface of block 42 is block extension 50 secured by set screws 51 adapted to extend rearwardly through opening 32, and is formed with a ledge 52 adapted to form a seat for cam plate 53 rotatably mounted on screw 54 threadedly engaged in block 55 secured to frame 2 by fastening elements 56. Spring 57 at one end is secured by pin 58 to block 50 and the other end by a pin 58′ to the rear surface of plate 19, so that wire feeding mechanism C is normally held in elevated position by spring 57 and is adapted to be forced down by cam 53, and tooth 47 in engagement with wire 39 forces the wire downward a distance equal to the limit of movement of said mechanism C, as and for a purpose, hereinafter more fully appearing. Mounted at the lower end of recess 31, plate 59 is secured by fastening element 60, and is formed adjacent its upper inner corner with slot 61 adapted to register with the diagonal tube 62 formed in plate 19 and constitutes a guide for wire 39 as it is advanced by feeding mechanism C to the wire cutting knife or shearing assembly D now to be described.

The lower end of plate 19 is formed with a V shaped extension 63, on which is mounted a similarly shaped stationary knife or blade element 64, suitably secured thereto by screws 65. The face of said element 64 is thicker at its upper edge than at its lower edge and is formed with a curved inclined slot 64′ and with a diagonal slot 66 slightly enlarged at its upper end as at 66′ and with its lower end terminating at said curved seat. The edge 67 of said slot constitutes the cutting or shearing edge of said stationary element 64, which is also formed with a similar shaped perpendicular slot 68 adapted to receive the plunger point 27, as will hereinafter more fully appear.

The complemental movable wire cutting or shearing blade 69 is movably mounted on plate 64 constructed with an outwardly and upwardly extending arm 70, formed at its upper edge with a rearwardly extending projection 71 terminating in an inclined contact face 72, and the end of said arm being inclined to form cam contact surface block 23. Said arm 70 is formed at its upper inner edge with plunger contact extension 74, adapted to reduce the frictional engagement of the plunger with said arm during its reciprocatory movement, as will hereinafter more fully appear. Movable blade 69 is apertured at its lower end to receive pin 75, adapted to extend through aperture 76 of stationary plate 64, and through the lower end of extension 63 to which it is rigidly secured by pin 77. Said pin 75 is formed with opening 78 extending in alignment with slot 68 formed in stationary blade 64.

Movable blade 69 is formed on its rear face with curved surface 69′ oppositely inclined to the complemental seat 64′ of blade 64 which it is adapted to engage, and the lower end 69″ of said blade below surface 69′ is thicker than the portion above said surface. Said blade 69 is formed in said rear surface with a slot 79 which enters surface 69′ and continues through said thickened portion 69″ as an opening extending to the lower edge of said blade as will be apparent. Said slot 79 is slightly enlarged at its upper end as at 80 similar to slots 66 and 68, and the edge 81 thereof constitutes the cutting or shearing edge of said blade in conjunction with edge 67 of stationary blade 64 when said elements are operatively assembled. The upper end 80 of slot 79 is adapted to initially register with slot or guide 62 so as to receive the wire 39 when it is advanced therein by feeding mechanism C a distance corresponding to the length of the fastener 82. Fastener 82 is formed as blade 69 is moved to bring slot 79 into registration with slot 68, which movement of said blade positions the fastener to be acted on by plunger point 27, as will be apparent as the description proceeds.

In this connection it will be observed that in forming the fastening element 82, the shearing movement of the cutting edges of 64 and 69 cuts or shears the wire at an angle and thereby forms fastener 82 with an oppositely inclined edge 83 at each end which is advantageous in effecting proper clinching of the element in the layers of material E as will be hereinafter more fully described.

Plate 19 is recessed as at 84 to accommodate arm 70 of movable knife 69 and the hook-like member 85 pivotally mounted as at 86 and formed with elongated finger portion 87 adapted to engage face 72 and maintain knife 69 in wire receiving position, and downward movement of cam block 23 is adapted to move arm 70 to a perpendicular position aligning slot opening 79 with slot 68, and the upward movement of cam 23 engaging under the substantially right angularly extending trigger portion 88 causes finger 87 to return arm 70 to its initial position.

Cam 53 extends through slot 53' in head 17 and is formed with arm 89 normally resting in a substantially upright position, the upper curved end of which is adapted to be engaged by the lower end 90 of arm 91 integrally connected with head F intermediate its length. Slightly spaced from arm 91 is operating rod 92 having its upper end suitably connected to head F adjacent one end thereof. A threaded bifurcated member 93 is mounted on the other end of head F by pin 94 and the upper end of plunger 22 is formed with an end member 95 suitably connected thereto, said end member being formed with threads extending oppositely to the threads of member 93, to which it is detachably connected by nut 96. Plunger 22, arm 91 and control pedal rod 92, extend through suitable openings in top plate 97 secured to head 17 by threaded bolt 98, said plate 97 being also recessed to permit end 40 of wire holder 34 to extend therethrough, so that the same may be disengaged from wire 39 as desired.

In order to limit the movement of cam 53 when returned to initial position by spring 57, a pin 99 is suitably mounted in block 55, and in order that said cam may be moved beyond pin 99 out of engagement with wire feeding mechanism C, thereby rendering said mechanism inactive, when repairing or adjusting the machine as desired, a pin 100 is mounted adjacent the upper end of said cam to form a hand grip therefor.

Pedal rod 92 extends through bearing opening 101 in head 17 and a similar opening 101 in base 3 and through section 6 and terminates in bifurcated member 102 threadedly or otherwise suitably mounted thereon. Member 102 is connected to pedal arm 103 by pin or bolt 104, one end of said pedal arm 103 being pivotally mounted on pin 105 in ears 103' suitably formed on base 3. Said arm extends through slots 106 formed in base 1 and has mounted on its free end pedal 107 secured thereto in any suitable manner. One end of spring 108 is connected to anchor clip 109 mounted on rod 92 and secured adjacent clip 102 by nut 110. The other end of said spring is connected to hook 111 suitably connected to flange 4, and is adapted to exert an upward pull on control or pedal rod 92 to normally maintain said rod and pedal 107 in elevated position. It is evident that when 107 is depressed, rod 92, head F, plunger 22 and arm 91 will be impelled downwardly, and in order that said plunger may not return to its initial raised position until it has reached the limit of its downward stroke, a ratchet mechanism G is associated with rod 92, and which mechanism will now be described.

Mechanism G comprising a plate 112 secured by screws, or any suitable manner to standard 2, and mounted on said plate substantially central of its length secured thereto by a screw or in any suitable manner is a slotted anchor post 113. Ratchet arm 114 is mounted in said slotted post substantially central of its length as at 115, and is slightly arcuate in configuration with its upper end rounded as at 116 and its lower end formed with a face 117 of ratchet finger 118 and heel 119. Mounted on said rod 92 is a cam member 120 suitably secured thereto by set screw 121, and series of ratchet teeth 122 are formed in the rod adjacent said cam, and adapted to be engaged by finger 118 of arm 114. Said cam 120 is adapted to engage end 116 when it reaches the limit of its upward stroke, causing finger 118 to engage the lowermost ratchet tooth 122. A spring 123 is mounted on plate 112 secured by plate 124 and screw 125, and is formed on its free end with a lateral catch 126 adapted to engage heel 119 and maintain finger 118 in engagement with ratchet teeth 122 during the downward stroke of rod 92, as clearly shown in Fig. 13 of the drawings. When rod 92 reaches the limit of its downward stroke cam 120 engages finger 118 kicking it back and causing catch 126 of spring 123 to engage face 117, and maintaining said finger out of the path of teeth 122, as clearly shown in Fig. 14, until rod 92 returns to its initial position and cam 120 again engages surface 116, causing finger 118 to again engage the lowermost tooth 122 as in the first instance. While we have shown one form of spring for controlling arm 114, it is obvious that this arrangement may be varied without departing from the scope or spirit of the invention.

In order to limit the upward movement of pedal 107 and rod 92, a bracket stop member 127 secured by a suitable fastening element is mounted on the inner surface of section 1, adapted to be engaged by buffer or shock absorbing medium 128 constructed of rubber or the like suitably mounted in the end of holder 129 mounted on and secured to pedal arm 103, similar to element 102, and which not only insures a gage for the upward stroke of rod 92, but constitutes a buffer for reducing the shock and vibration incident to the release of pedal 107.

In order that the anvil section 15 may move upwardly and engage the under surface of the shoe sole or other material being united and hold the same in firm position with respect to opening 79 simultaneously with the downward movement of pedal arm 103, a rod 130 suitably connected at its lower end to arm 103 by bifurcated member 102', similar to arm 92, extends upwardly through a slot in the rear wall of standard 1 with its upper end suitably connected to one end of spring 131, the other end of said spring being connected to hook 132 suitably connected to one end of arm 133. Arm 133 is fulcrumed on pin 134 mounted in bracket 135 suitably secured to frame section 1 by a bolt or in any suitable manner, and rotatably mounted on pin 136 in the end of arm 133 is roller 137 adapted to engage the end of bushing 9 and elevate anvil member 15 when pedal 107 is depressed as will be clear without further discussion. Spring 131 is adapted to compensate for different thicknesses of material E, as will be well understood.

Mounted on the upper end of section 2 by bolts 138 is a bracket 139 in the upper end of which is mounted casing 140, in which is rotatably mounted reel 141 on which is wound wire 39 adapted to be held in place by nut 142. Wire 39 extends through opening 143, through top 97, between the wall of recess 33 and tooth 35, through feeding mechanism C between flange 43 and tooth 47, and through guide 62 to knife 69. Tooth 47 being normally in engagement with wire 39, each downward stroke of mechanism C advances said wire into knife 69 a predetermined distance, and in order to vary the distance the wire is advanced at each stroke, thereby varying the length of the fastening elements formed by knife mechanism D, it is necessary to control mechanism C accordingly. Therefore, as the bottom wall of opening 32 constitutes a stop for the downward movement or stroke of mechanism C, to vary the feeding stroke of said mechanism, it is necessary to control and vary the stop for limiting the upward movement of said mechanism C when same is returned to its uppermost position by spring 57, and which is accomplished by the structure now to be described.

Mounted adjacent ledge 52 in block 50 and projecting laterally therefrom is pin 144 adapted to extend through slot 145 formed in flange 18 and adapted to engage lug 146 integrally formed with or secured to lever 147, suitably journaled at its lower end on stub shaft 148, integrally formed with or suitably mounted in the edge of plate 19 to which it is secured by nut 149. Lever 147 is formed at its upper end with operating handle 150 and with tooth 151 for engagement with the teeth of curved rack 152 suitably mounted on plate 19 adjacent its upper edge. It is apparent that movement of lever 147 and stop lug 146 adapted to engage pin 144, determines the upward movement of feeding mechanism C, and therefore, a predetermined setting of lever 147 controls the length of the feeding stroke of said mechanism C and determines the length of the fastening elements 82, as desired.

In order to regulate the position of the shoe or layers of material to be united with respect to the fastener or nail feeding opening 79 and plunger point 27 operating therethrough so as to insure a uniform line of stitching with respect to the edge of such material, a gage or regulating mechanism H is mounted adjacent the lower edge of knife mechanism D, which will now be described.

Mechanism H comprises a bracket 153 suitably formed with or connected to standard 16 formed at its free end with a vertical stub shaft 154 and an anchor slide plate 155 constructed with an extension 156 suitably formed at its outer curved edge with rack teeth 157, and projecting at an angle rearwardly with its end spaced from said rack is a projection 158 rotatably mounted on said stub shaft 154 and secured in any desired adjusted position by thumb screw 159. Extension 156 is formed substantially central of its length with a stub shaft 160, on which is rotatably mounted lever 161 substantially central of its length. The free end of said lever constitutes an operating handle and the other end is rounded or ball pointed for engagement in the transverse substantially V-shaped slot 162 formed in the upper surface of slide 163 slidably mounted in recess 164 formed in said plate adjacent one edge, said slide being formed with a depending projection 165 adapted to limit the retractile movement of said slide, the opposite movement being limited by lug 166 suitably formed on extension 156 constituting a stop for lever 161. Lever 161 adjacent its free end is also formed with operating knob 167. It is apparent that the edge of the material to be united when placed intermediate anvil 15 and knife mechanism D will contact the end of slide 163, which constitutes a gage or guide settable as desired, to control the points of insertion of the fasteners with respect to the edge of the sole or materials being united.

In order to properly house the parts mounted in plate 19, a detachable cover plate 168 is provided suitably secured by bolts 169 and wing nuts 170.

*Operation*

Although the operation of the device would seem to be clear from the above description, it might be well to further state that when the wire has been introduced into the machine passed beyond finger 34, through mechanism C and guide 62 with its end adjacent the upper edge of knife 69 and in alignment with opening 79, lever 147 having been set according to the length of fastener 82 desired, and gage mechanism H properly set, and the material to be united positioned on anvil face 15 with its edge in engagement with slide 163, downward movement of pedal 107 will pull down rod 92, head F, arm 91 and plunger 22. During the downward stroke of said plunger 22 arm 91 engages cam 53 moving feeding mechanism C, and tooth 47 in engagement with wire 39 feeds said wire into the complemental slots 66 and 79, a distance equal to the downward stroke of mechanism C. When said mechanism has reached the limit of its downward stroke, the surface 26 of cam 23 engages cam surface 23 of arm 70, moving said arm to perpendicular position and actuating said knife 69, whereby the cutting edges 67 of the stationary knife and 81 of the movable knife effect shearing of wire 39 and forming fastener element 82 with an inclined point, and as arm 70 reaches its limit of movement opening 79 carrying the fastener 82 will register with opening 68 and in alignment with plunger point 27 by which time the plunger point has reached the upper edge of said knife mechanism H, and as it continues on its downward stroke it expels fastener 82 from opening 79 and inserts it in the layers of material to be united. The lower end of the fastener contacting anvil 15 is clinched in one direction and in view of the oppositely inclined point, the other end is clinched by said plunger in the opposite direction, thereby effecting a neat fastening effect.

While plunger 22 moves downward carrying cam 23 with it, arm 91 moves downward through the medium of head F. Arm 91 in movement forces abutment 90 against arm 89 of cam 53, thus rotating cam 53 in a counter-clockwise direction, as viewed in Figure 4. Said rotation frees abutment 90 from downward contact with the edge of 89, allowing downward motion of head F and its associated mechanism to continue.

Simultaneously with the downward movement of rod 92 rod 130 depresses one end of arm 133 contacting roller 137 with bushing 9 and elevating anvil 15 into binding contact with the material being united. Also during such downward stroke of rod 92, ratchet mechanism G prevents any upward movement of said rod, plunger and associated parts until all such mechanisms have reached the limit of their downward strokes, and as said rod 92 reaches such limit cam 120 with spring 123 effects movement of ratchet arm 114 to inoperative position, thereby permitting said rod to be returned to its initial position. It will be observed that the action of all of the above parts takes place during the downward movement of plunger 22, and while it is traveling from its initial position to the limit of its downward movement. Upon removal of pressure from pedal 107, spring 108 returns said pedal, pedal rod, and plunger to their initial positions and ready for another cycle of operation, as will be clear without further description.

It will also be noted that the return stroke or upward movement of plunger 22 causes cam 23 to engage and elevate trigger 88 causing finger 87 to move arm 70 to return knife element 69 to its initial position with opening 79 in alignment with guide 62 in readiness to receive the end of wire 39, as in the first instance.

From the above it is apparent that we have designed a machine for making and inserting metallic fasteners in shoe soles and the like, compact in form, embodying novel mechanisms coacting to sever the wire, position the fastener with respect to the inserting mechanism and insert the same in the materials to be united, during the downward stroke of the plunger mechanism, yet manufacturable at a minimum cost and efficient for the purposes intended.

Although in practice we have found that the form of our invention illustrated in the accompanying drawings and referred to in the above description as the preferred embodiment, is the most efficient and practical, yet realizing that conditions concurrent with the adoption of our invention will necessarily vary, we desire to emphasize that various minor changes in details of construction, proportion and arrangements of parts, may be resorted to within the scope of the appended claims without departing from or sacrificing any of the principles of this invention.

Having thus described our invention, what we desire protected by Letters Patent is as set forth in the following claims:

1. A device for making and inserting metallic fasteners formed from a continuous wire comprising a wire feeding mechanism, a plunger mechanism including a cam block member, a fastener forming knife mechanism including stationary and movable blade elements, a hook-like trigger member adapted to move said movable blade to and maintain the same in wire cutting position when actuated by said cam block traveling upwardly, said block adapted to engage and move said blade in cutting direction when moving downwardly, and means for operating said movable mechanisms, whereby said movable blade is adapted to form and position the respective fastener elements in the path of said plunger.

2. A device for making and inserting metallic fasteners formed from a continuous wire comprising a wire feeding mechanism, including a movable ratchet finger carrying block having a projection, resilient means for elevating and normally maintaining the block in elevated position, and settable lever means coacting with said projection for controlling the upward movement of the block to vary its feeding stroke, a plunger mechanism, and a fastener forming knife mechanism including a movable blade member, and means associated with said mechanisms for effecting their operations simultaneously with the downward stroke of said plunger mechanism, whereby said blade receives a portion of the wire from the feeding mechanism, forms the fastener, and positions it in alignment with said plunger.

3. A device for making and inserting metallic fasteners formed from a continuous wire comprising a fastener inserting plunger mechanism and a fastener forming knife mechanism including a movable blade element, means for feeding the wire to said blade element, said blade adapted to form the fastener and place the same in position to be expelled by said plunger, a trigger member, and cam block means in connection with said plunger for operating said blade in cutting direction when moving in one direction and coacting with said trigger to effect return movement of said blade when moving in the opposite direction.

4. A device for making and inserting metallic fasteners formed from a continuous wire comprising a plunger mechanism, a wire feeding mechanism, a fastener forming knife mechanism, and an anvil mechanism, and means for effecting operation of the wire feeding, plunger, and knife mechanisms, and move said anvil in elevating direction simultaneously with the downward stroke of said plunger mechanism.

5. A device for making and inserting metallic fasteners formed from a continuous wire comprising an anvil, a wire feeding mechanism, a plunger mechanism and a wire cutting mechanism, operating means for effecting simultaneous operation of said mechanisms and move said anvil in elevating direction during the downward movement of the plunger mechanism, and means associated with said operating means for preventing return of the plunger mechanism to its initial position until it has reached the limit of its downward stroke.

6. A device for making and inserting metallic fasteners formed from a continuous wire comprising a plunger mechanism including a plunger head having an arm member, and an operating rod connected to said head, a wire feeding mechanism including a cam element coacting with said arm and adapted to advance the wire a distance equal to the length of the fastener element to be formed during each feeding operation, lever means controlling said feeding mechanism to vary the length of the fastener, knife means for severing the length of wire advanced to form the respective fastener and movable to fastener expelling position with respect to said plunger, and means for operating said rod to move said plunger in fastener expelling direction.

7. A device for making and inserting metallic fasteners formed from a continuous wire comprising a plunger mechanism including a plunger head and an operating rod connected thereto, and fastener forming knife mechanism including a movable blade having an opening terminating at one end in a slot having a cutting edge adapted to diagonally cut said wire, the wire feeding mechanism adapted to advance the wire a predetermined distance within said opening, means for moving the blade to form said fastener and position the same in alignment with said plunger, means for actuating said rod to move the plunger in fastener expelling direction, and means carried by said rod for preventing the return of the plunger to its initial position until it has reached the limit of its stroke in expelling direction.

8. A device for making metallic fasteners from a continuous wire and inserting the respective fasteners in layers of material to be united, such as shoe soles and the like, comprising a plunger mechanism including a plunger head having an operating rod connected thereto and formed with a cam operating arm, a wire feeding mechanism including a movable cam associated therewith, and a fastener forming knife mechanism adapted to receive a predetermined length of wire, diagonally sever the same and position it in alignment with said plunger mechanism, and means associated with said arm and plunger for effecting simultaneous operation of said wire feeding and fastener forming mechanisms and insertion of said fastener in the material to be united during the downward stroke of said plunger, and means associated with said plunger operating rod automatically operable to prevent the plunger's return to initial position until it has reached the limit of its stroke in fastener inserting direction.

9. A device for making metallic fasteners from a continuous wire and inserting the respective fasteners in layers of material to be united, such as shoe soles and the like, comprising a plunger mechanism, a wire feeding mechanism, and a wire cutting mechanism formed with an opening, said cutting mechanism adapted to form and position the respective fasteners in alignment with said plunger, an anvil for supporting the material or sole to be operated upon, adjustable means for predeterminedly positioning the edge of said material with respect to the opening in said cutting mechanism, means for simultaneously actuating said plunger downward in fastener inserting direction and said anvil in upward material-compressing direction.

10. A device for making metallic fasteners from a continuous wire and inserting the respective fasteners in layers of material to be united, such as shoe soles and the like, comprising a plunger mechanism, a wire feeding mechanism including a movable cam element, and a fastener forming knife mechanism including a movable blade, means carried by said plunger for alternately positioning said blade with respect to said feeding and plunger mechanisms, head means connected to said plunger and having an arm engageable with said movable cam, an anvil, pedal operable means coacting with said anvil, and a pedal operable control rod connected to said head, whereby depression of said pedal pulls down said head effecting simultaneous operation of said plunger, wire feeding mechanism and fastener forming blade and elevating movement of said anvil during the travel of said plunger from its initial position to the limit of its downward stroke.

11. A device for making metallic fasteners from a continuous wire and inserting the respective fasteners in layers of material to be united, such as shoe soles and the like, comprising a plunger mechanism, a fastener forming knife mechanism, and a wire feeding mechanism, an anvil adapted to support the material being united with respect to the fastener forming mechanism, a pedal operable control rod connected to said plunger, and pedal controlled anvil elevating means, whereby depression of said pedal effects operation of said plunger, wire feeding mechanism, fastener forming mechanism, and anvil elevating means, simultaneously and during the travel of said plunger to the limit of its downward stroke.

12. In combination with a plunger mechanism for actuating the parts of the mechanism including a plunger and a plunger head connected to the upper end thereof, a wire feeding means, a movable cutter blade, a trigger member, means carried by said head for operating the wire feeding means in feeding direction, a cam block carried by said plunger for operating the movable blade in cutting direction when moving downwardly and coacting with said trigger to return the blade to its initial position when moving upwardly.

13. In combination with a plunger mechanism including a plunger, a plunger head having an arm member, a wire feeding mechanism, a cam element associated with said feeding mechanism and coacting with said arm to advance said mechanism in feeding direction, a wire cutting mechanism including a movable blade having a slot-like opening with a shearing edge adapted to cut said wire diagonally with respect to its longitudinal axis to form a fastener, trigger means, and a cam element carried by the plunger adapted to move said blade in cutting direction during the downward movement of the plunger and coact with said trigger to return said blade to its initial position during the upward movement of said plunger.

14. A device for making and inserting metallic fasteners formed from a continuous wire including a frame, a wire feeding mechanism including a movable cam, a plunger mechanism including a removable plunger point, an arm coacting with said movable cam, an operating rod formed with a series of ratchet teeth and having mounted thereon a cam element, and a spring controlled ratchet bar movably mounted on the frame adapted to coact with said cam and ratchet teeth, whereby reverse movement of the plunger is prevented until it has reached the limit of its downward stroke.

15. A device for making and inserting metallic fasteners in layers of material such as shoe soles and the like, comprising a plunger mechanism, an anvil mechanism including a movable arm, an operating element, means connecting the plunger mechanism and operating element, and yieldable means connecting said arm and element, whereby simultaneous movement in meeting direction of the plunger and anvil mechanism is effected, the extent of the upward movement of the anvil being determined by the work, the variation in the thickness thereof being compensated for by said yieldable means.

16. In a device for making a plurality of pointed wire fasteners from a single length of wire, a stationary axle having a passageway therethrough, a pivotable blade journaled upon said axle having a convex portion concentric with its axis of pivoting, the pivotable blade also having a slot extending non-tangentially in a plane perpendicular to said axis and adjacent the convex portion and passing therethrough as a tunnel, a fixed blade, means for pivoting the pivotable blade adjacent the fixed blade, the fixed blade having a concave portion complementary to the convex portion of the pivotable blade, the fixed blade also having on its working face a slot extending in a plane perpendicular to said axis outwardly from the peripheral zone of the concave portion so as to be alignable with the slot on the pivotable blade, means to move the pivoting blade into position aligning the slot thereon with the slot on the fixed blade, a guiding tube adapted to receive an end of a length of wire and hold the wire adjacent the fixed blade in the slots of said blades, shearing surfaces on said blades adapted to cooperate in shearing the wire diagonally to its length, means to feed the wire into the holding means and into said blades, means to move the pivotable blade through its shearing stroke whereby a fastener is formed from the wire and whereby the fastener is held within the tunnel portion of the pivotable blade, a plunger, said blade moving means also aligning said tunnel portion with the plunger and with the passageway in said axle, and means to move the plunger into said tunnel portion, whereby the fastener is ejected.

17. In a device for making and inserting metallic fasteners formed from a continuous wire, a plunger member, means to operate the plunger member, a wire cutting mechanism comprising an axle having a passageway extending laterally therethrough adapted to permit passage of a wire and to receive the plunger member in snug fitting relationship, a blade member journaled on the axle, said blade member having wire receiving and fastener inserting positions relatively pivoted about the axle, said blade member having a tunnel-like opening therethrough adapted to be aligned with said passageway when the blade member is in fastener driving position, said opening terminating at one end in a slot having depths decreasing toward the portion farthest from the axle, a coaxial fixed member having a complementary face adjacent to the blade member, and having a slot complementary to the slot on the blade member, said two slots being adapted to be aligned so as to jointly form a tunnel-like opening for passage of the wire, said slots being aligned when the blade member is in wire receiving position, cutting edges on the blade member and the fixed member, said cutting edges forming edges of said slots and adapted to cut the wire diagonally when the blade member is moved from wire receiving to fastener inserting position, whereby a fastener may be formed from the wire and aligned in fastener inserting position in a single motion.

18. A device for making and inserting metallic fasteners formed from a continuous wire including a frame, a driver, a wire feeding mechanism including a spring controlled slidable block structure normally held in elevated position, a wire gripping element carried by said block, a movable cam member carried by the frame and adapted to depress said block structure into lowered position, reciprocating means for operating the driver, said reciprocating means being operative during the middle portion of its stroke to move the cam member to position for depressing said block structure, said reciprocating means being inoperative at the ending portion of its stroke for moving the cam member to said block structure depressing position, means settable to vary the feeding stroke of said block structure, and means permitting movement of the wire in feeding direction but normally preventing its movement in reverse direction.

19. In a device for making a plurality of pointed wire fasteners from a single length of wire, a plunger block having a cam surface, a plunger pin carried by the plunger block, a stationary axle having a passageway therethrough, a pivotable blade journaled upon said axle having a convex portion concentric with its axis of pivoting, the pivotable blade also having a slot extending non-tangentially in a plane perpendicular to said axis and adjacent the convex portion and passing therethrough as a tunnel, a fixed blade, the fixed blade having a concave portion complementary to the convex portion of the pivotable blade, the fixed blade also having on its working face a slot extending in a plane perpendicular to said axis and outwardly from the peripheral zone of the concave portion so as to be alignable with the slot on the pivotable blade, means to move the pivotable blade into position aligning the slot thereon with the slot on the fixed blade, a guiding tube adapted to receive an end of a length of wire and hold the wire adjacent the fixed blade in the slot of said blade, shearing surfaces on said blades adapted to cooperate in shearing the wire diagonally to its length, means to feed the wire into the holding means and into said blades, an arm carried by the pivotable blade and engageable by the cam surface of the plunger head, said cam surface and said arm being so adapted that the beginning part of the downward plunger head stroke moves the movable blade through its cutting stroke, whereby a fastener is formed from the wire and whereby the fastener is held within the tunnel portion of the pivotable blade, said tunnel portion being aligned at the completion of its cutting stroke with the passageway in said axle and with the line of travel of the plunger pin, the fastener being driven during the latter part of the downward plunger head stroke, and means to move the plunger head.

DAVIS J. AJOUELO.
SUSAN ANSLEY MOORE,
*Executrix of the Estate of James Linton Moore, Deceased.*